United States Patent

Chen

Patent Number: 5,900,081
Date of Patent: May 4, 1999

[54] COMPUTERIZED METHOD FOR FORGING, QUENCHING AND TEMPERING METAL

[76] Inventor: Mu-Shun Chen, 15, Lane 76, AnChi St., An-Chi Village, Show-Swei Hsiang, Chang-hua Hsien, Taiwan

[21] Appl. No.: 08/806,602

[22] Filed: Feb. 26, 1997

[30] Foreign Application Priority Data

Jan. 17, 1997 [TW] Taiwan .................................. 86100469

[51] Int. Cl.$^6$ .................................................. C21D 8/00
[52] U.S. Cl. .......................... 148/575; 148/574; 148/649
[58] Field of Search .................................... 148/574, 575, 148/569, 570, 649

[56] References Cited

U.S. PATENT DOCUMENTS 5,415,712  5/1995  Thomboo ................................ 148/707

FOREIGN PATENT DOCUMENTS 11687  2/1989  Japan ...................................... 148/575

*Primary Examiner*—Deborah Yee
*Attorney, Agent, or Firm*—Bacon & Thomas, PLLC

[57] ABSTRACT

A CNC method for forging, quenching and tempering a metal material is composed of an automatic process of feeding a metal material, which is uniformly heated at a temperature of 1000° C. for about one minute by an induction coil and is subsequently forged to take form. The forged metal is then checked and quenched. The metal material so treated is finally tempered to have proper texture, consistency, hardness, and toughness.

1 Claim, 3 Drawing Sheets a
COMPUTERIZED METHOD FOR FORGING, QUENCHING AND TEMPERING METAL

FIELD OF THE INVENTION

The present invention relates; generally to a process for forging and quenching metal, and more particularly to a CNC (computer numerical control) or computerized method for forging, quenching and tempering a meal material.

BACKGROUND OF TEE INVENTION

The conventional method for forging and quenching metal involves a first step in which a metal material is heated at a temperature as high as 1100° C. for 30 minutes. The heat-treated metal is then forged. The forged metal is then cooled before it is subjected to heating at a temperature ranging between 880° C. and 950° C. The forged metal is cooled suddenly by plunging into oil. The quenched metal is finally tempered.

The conventional forging and quenching method described above is generally defective in design in that the heating duration is too long, and that the oil burning furnace used in heating tile metal is a culprit for air pollution, and further that the quality of the metal so treated is unduly compromised, and still further that the method is not cost-effective.

SUMMARY OF THE INVENTION

It is therefore the primary objective of the present invention to provide a CNC or computer controlled method for forging and quenching metal, which is efficient and pollution-free.

It is another objective of the present invention to provide a cost-effective CNC method for forging and quenching metal.

In keeping with the principle of the present invention, the foregoing objectives of the present invention are accomplished by a CNC-assisted method for forging, quenching and tempering metal. The method of the present invention makes use of the CNC technology to automate the process of forging ad quenching metal. A computer-driven conveyer system is used to automate the process of feeding the metal intended to be forged. The metal is then carried by two carrying devices such that the metal is moved about in an induction coil, and that the metal is heated uniformly at a temperature of 1000° C. for one minute. Thereafter, the metal is forged to take form before the forged metal is cooled suddenly by plunging into water. The metal so treated is finally tempered to have proper texture, consistency, hardness, and toughness.

The foregoing objectives, features, functions, and advantages of the present invention will be more readily understood upon a thoughtful deliberation of the following detailed description of an embodiment of the present invention in conjunction with the accompanying drawings.

DETAILED DESCRIPTION OF THE PREFERRED EMBODIMENT

Figure 1:
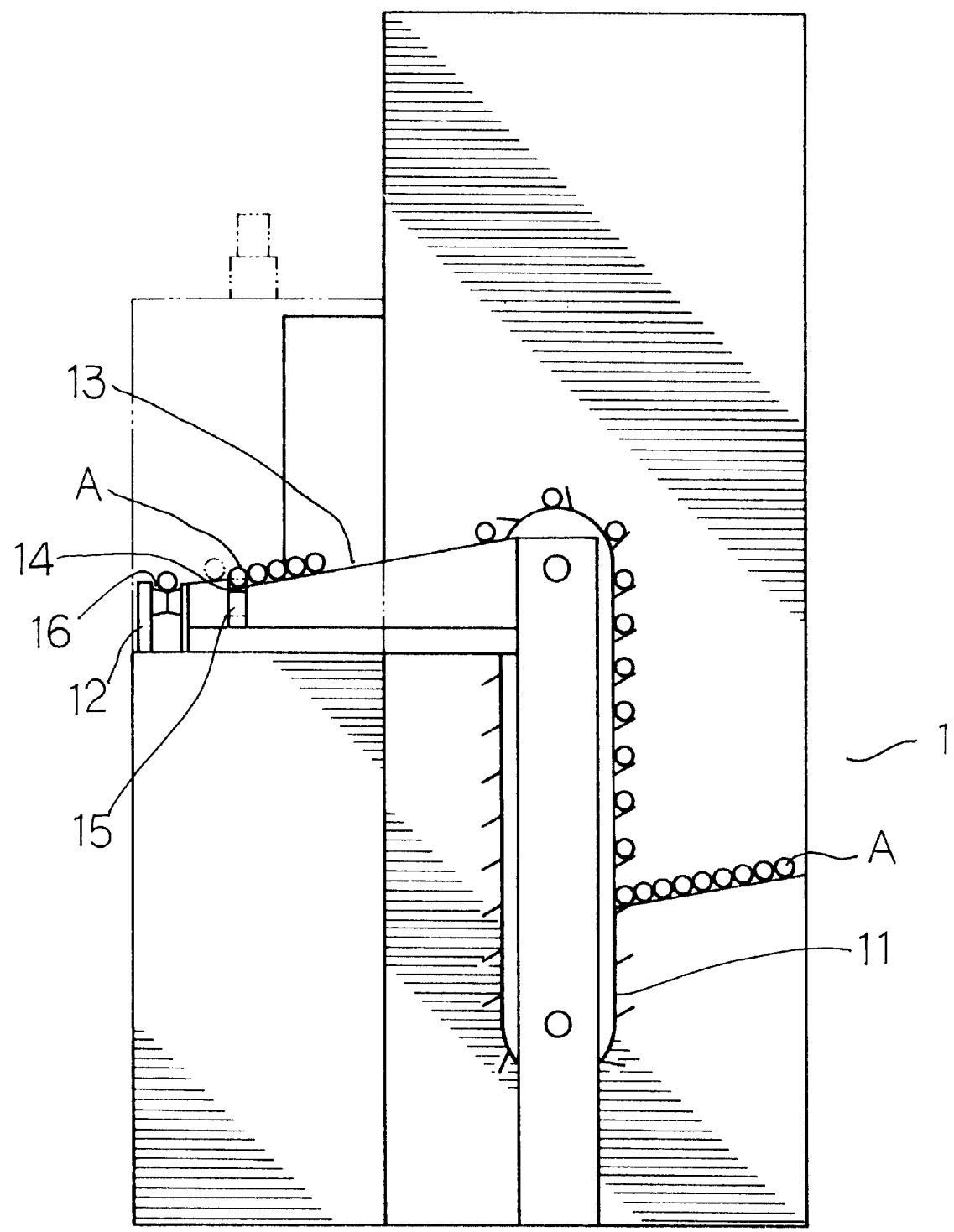
FIG. 1 shows a side schematic view of the preferred embodiment of the present invention.
Figure 2:
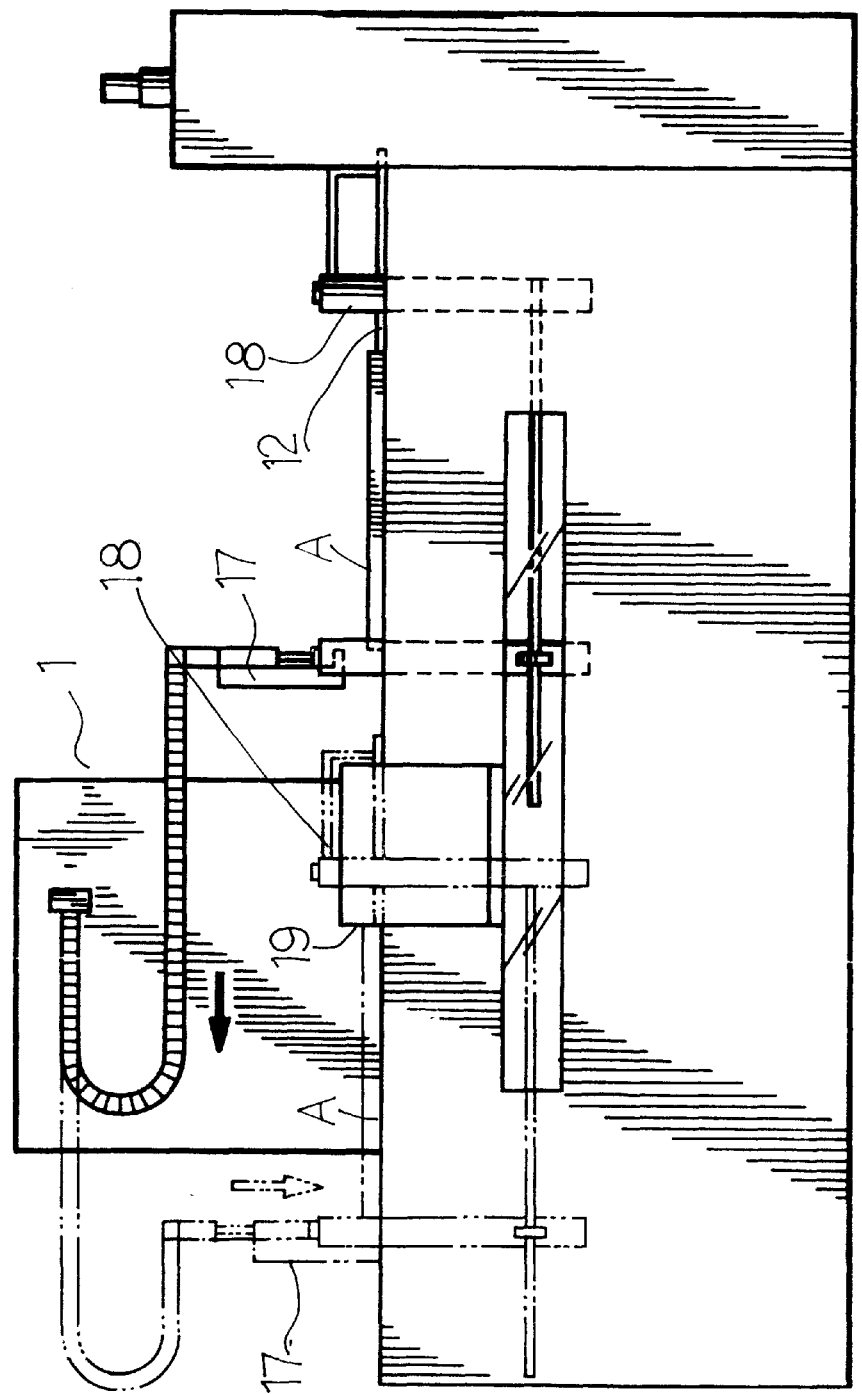
FIG. 2 shows a front schematic view of the embodiment of the present invention.

As illustrated in FIGS. 1 and 2, a metal forging and quenching system of the embodiment of the present invention comprises a CNC main machine 1, which is composed of a conveyer system 1, a platform 12, two carrying devices 17 and 18, and an induction coil 19.

The conveyer system 1 is used to transport the metal material A to the platform 12 which is provided with an inclined plane 13 and a recess 14 located at the low end of the inclined plane 13. The recess 14 is provided therein with a lifting block 15 capable of pushing the metal material A. Located at one end of the platform 12 is a slide slot 16. The two carrying devices 17 and 18 are located on the platform 12 such that they are controlled by a CNC computer. Located between the carrying devices 17 and 18 is the induction coil 19.

Figure 3:
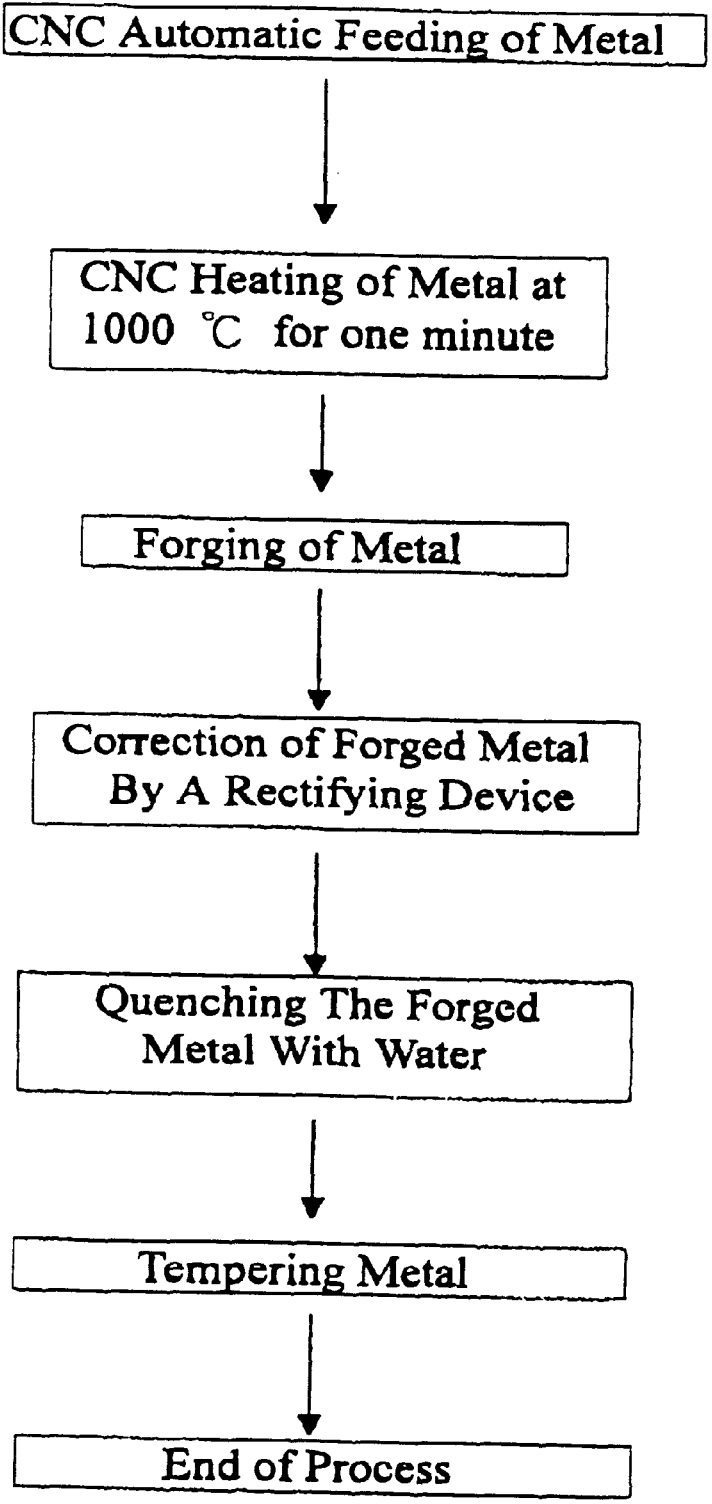
FIG. 3 shows a flow chart of the preferred embodiment of the present invention.

In operation, the metal material A is carried by the conveyer system 11 to the platform 12 such that the metal material A is deposited in the slide slot 16 of the platform 12 of the CNC main machine 1. As soon as the metal material A is deposited in the slide slot 16, a servomotor controlled by the computer of the CNC main machine 1 is so activated that the carrying devices 17 and 18 are driven to carry the metal material A into the induction coil 19 in which the metal material A is rotated and heated uniformly at a temperature on the order of 1000° C. for about one minute. The induction heating of the metal material A is brought about by means of the magnetic field induction of the induction coil 19. Upon completion of the heating of the metal material A, the metal material A is forged to take shape. The forged metal material A is then checked or treated with a rectifying device before the metal material is subjected to a quenching process in which the metal material A is cooled suddenly by means of water, as illustrated in FIG. 3. The rectifying device may comprise a machine capable of repetitive operation to remove irregularities on the edges of the metal material or to straighten the material after forging. The quenched metal material A is finally tempered.

The CNC method of the present invention has several inherent advantages over the prior art method. The heating time of the method of the present invention is substantially shortened. In the meantime, the induction heating of the method of the present invention is free from the pollutant. Moreover, the physical properties of the metal material forged and quenched by the CNC method of the present invention are greatly enhanced, as exemplified by the test results shown in the attached papers, The Attached Paper No. 1 shows a series of the destruction test results while the Attached Paper No. 2 shows a magnified photo of the grain phase of a finished product made by the CNC method of the present invention.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A CNC (computer numerical control) method for forging, quenching and tempering a metal material, the CNC method comprising the steps of:

(a) feeding a metal material by a conveyer system into a platform of a main machine controlled by a computer numerical control mechanism;

(b) moving the metal material into an induction coil of the main machine by a carrying mechanism driven by a servomotor which is controlled by the computer numerical control mechanism;

(c) rotating the metal material repeatedly inside the induction coil while the metal material is heated by the induction heating of the induction coil at a temperature of 1000° C.;

(d) forging the heated metal material into a desired form;

(e) checking the forged metal material with a rectifying device;

(f) quenching the checked metal material by water; and (g) tempering the quenched metal material.

* * * * *